(12) United States Patent
Thibado

(10) Patent No.: US 12,381,418 B2
(45) Date of Patent: *Aug. 5, 2025

(54) DEVICE FOR AMBIENT THERMAL AND VIBRATION ENERGY HARVESTING

(71) Applicant: Board of Trustees of The University of Arkansas, Little Rock, AR (US)

(72) Inventor: Paul Thibado, Fayetteville, AR (US)

(73) Assignee: Board of Trustees of The University of Arkansas, Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,392

(22) Filed: Jul. 11, 2023

(65) Prior Publication Data

US 2023/0352975 A1     Nov. 2, 2023

Related U.S. Application Data

(63) Continuation of application No. 17/237,676, filed on Apr. 22, 2021, now Pat. No. 11,705,756.

(60) Provisional application No. 63/013,631, filed on Apr. 22, 2020.

(51) Int. Cl.
*H02J 50/00* (2016.01)
*H02N 3/00* (2006.01)

(52) U.S. Cl.
CPC ............ *H02J 50/001* (2020.01); *H02N 3/00* (2013.01)

(58) Field of Classification Search
CPC .......... H02J 50/00; H02J 50/001; H02N 3/00
See application file for complete search history.

(56) References Cited

U.S. PATENT DOCUMENTS

| | | | | |
|---|---|---|---|---|
| 4,808,886 A | * | 2/1989 | Lathom | H05B 41/28 363/63 |
| 4,995,069 A | * | 2/1991 | Tanaka | H05G 1/10 378/101 |
| 6,444,516 B1 | * | 9/2002 | Clevenger | H10D 64/664 257/E21.198 |
| 7,834,263 B2 | | 11/2010 | DeSteese et al. | |

(Continued)

FOREIGN PATENT DOCUMENTS

| | | |
|---|---|---|
| CL | 200501653 A1 | 7/2005 |
| CN | 104067087 A | 9/2014 |

(Continued)

OTHER PUBLICATIONS

International Search Report and Written Opinion issued for Application No. PCT/US2021/028638, date Jul. 22, 2021.

(Continued)

*Primary Examiner* — Rexford N Barnie
*Assistant Examiner* — Joseph N Inge
(74) *Attorney, Agent, or Firm* — Meunier Carlin & Curfman LLC

(57) ABSTRACT

An integrated circuit on a chip may include a plurality of capacitors that are connected in series and generate an AC noise signal. A selected bandwidth of the AC noise signal transmits through the series of capacitors as a first AC power signal. Respective rectifiers are positioned for receiving a positive cycle of the first AC power signal and a negative cycle of the first AC power signal. Output terminals are connected to the respective rectifiers and configured for connection to an off chip circuit. The capacitors may be fixed or variable gap capacitors.

8 Claims, 8 Drawing Sheets

(56) References Cited

U.S. PATENT DOCUMENTS

| | | |
|---|---|---|
| 7,839,058 B1 | 11/2010 | Churchill et al. |
| 7,851,691 B2 | 12/2010 | DeSteese et al. |
| 8,455,751 B2 | 6/2013 | Olsen et al. |
| 8,552,617 B2 | 10/2013 | Lim |
| 9,142,857 B2 | 9/2015 | Lee et al. |
| 9,281,461 B2 | 3/2016 | Olsen et al. |
| 9,515,245 B2 | 12/2016 | Hussain et al. |
| 9,698,707 B2 | 7/2017 | Monfray et al. |
| 9,837,595 B2 | 12/2017 | Yu et al. |
| 9,893,261 B1 | 2/2018 | Boyd et al. |
| 10,014,461 B1 | 7/2018 | Boyd et al. |
| 10,056,538 B1 | 8/2018 | Boyd |
| 10,079,554 B2 | 9/2018 | Tremblay |
| 10,079,561 B1 | 9/2018 | Boyd |
| 10,109,781 B1 | 10/2018 | Boyd |
| 10,199,958 B2 | 2/2019 | Shin et al. |
| 10,249,810 B2 | 4/2019 | Boyd |
| 10,546,991 B2 | 1/2020 | Boyd |
| 10,553,774 B2 | 2/2020 | Boyd |
| 10,600,948 B1 | 3/2020 | Liu |
| 10,600,950 B2 | 3/2020 | Boyd |
| 10,707,267 B2 | 7/2020 | Boyd |
| 10,756,249 B2 | 8/2020 | Boyd |
| 10,848,079 B2 | 11/2020 | Ma et al. |
| 10,855,101 B2 | 12/2020 | Jung et al. |
| 10,873,276 B2 | 12/2020 | Ma et al. |
| 10,985,677 B2 | 4/2021 | Boyd et al. |
| 11,069,848 B2 | 7/2021 | Boyd |
| 11,705,756 B2 * | 7/2023 | Thibado .................. H02J 7/345 307/109 |
| 2003/0015997 A1 | 1/2003 | Chloupek |
| 2012/0267899 A1 | 10/2012 | Huffman |
| 2012/0283807 A1 | 11/2012 | Deterre et al. |
| 2012/0312102 A1 | 12/2012 | Alvarez et al. |
| 2013/0033131 A1 | 1/2013 | Stella et al. |
| 2013/0193930 A1 | 1/2013 | Baugher |
| 2013/0214875 A1 | 8/2013 | Duncan |
| 2013/0313943 A1 | 11/2013 | Duncan et al. |
| 2015/0115767 A1 | 4/2015 | Pinkerton et al. |
| 2015/0333534 A1 | 11/2015 | Liu et al. |
| 2016/0111978 A1 | 4/2016 | Kim et al. |
| 2016/0211828 A1 | 7/2016 | Simmonds et al. |
| 2016/0315561 A1 | 10/2016 | Shin et al. |
| 2016/0336880 A1 | 11/2016 | Gruenwald |
| 2017/0201170 A1 | 7/2017 | Abu-Hajar |
| 2017/0287977 A1 | 10/2017 | Moroz et al. |
| 2018/0294393 A1 | 10/2018 | Boyd et al. |
| 2019/0063412 A1 | 2/2019 | Strano et al. |
| 2019/0386584 A1 * | 12/2019 | Thibado .................. H02N 1/08 |
| 2020/0028053 A1 | 1/2020 | Strano et al. |
| 2020/0067352 A1 | 2/2020 | Kothari |
| 2020/0076199 A1 | 3/2020 | Kaufman et al. |
| 2020/0227614 A1 | 7/2020 | Boyd et al. |
| 2020/0388744 A1 | 12/2020 | Boyd et al. |
| 2021/0265984 A1 | 8/2021 | Kaufman et al. |

FOREIGN PATENT DOCUMENTS

| | | |
|---|---|---|
| CN | 206773914 U | 12/2017 |
| EP | 2835903 B1 | 11/2015 |
| EP | 2679183 B2 | 3/2018 |
| EP | 3096366 B1 | 5/2019 |
| EP | 3477697 B1 | 5/2020 |
| JP | 2002-124672 A | 4/2002 |
| JP | 2006-158043 A | 6/2006 |
| JP | 2012-143121 A | 7/2012 |
| JP | 2014-036462 A | 2/2014 |
| JP | 2019-533419 A | 11/2019 |
| KR | 101199117 B1 | 2/2012 |
| KR | 20120074556 A | 7/2012 |
| WO | 2013190744 A1 | 12/2013 |
| WO | 2013192335 A1 | 12/2013 |
| WO | 2014/017204 A1 | 1/2014 |
| WO | 2015163178 A1 | 10/2015 |
| WO | 2016061155 A1 | 4/2016 |
| WO | 2018119180 A1 | 6/2018 |
| WO | 2019232232 A1 | 6/2018 |
| WO | 2018190902 A1 | 10/2018 |
| WO | 2018190903 A1 | 10/2018 |
| WO | 2020037034 A1 | 2/2020 |

OTHER PUBLICATIONS

International Search Report, PCT/US17/67798 filed on Dec. 21, 2017.

International Search Report, PCT/US19/34688 filed on May 30, 2019 (2019232232).

Ackerman, et al., Anomolous Dynamical Behavior of Freestanding Graphene Membranes, Physical Review Letters, DOI: 10.1103/PhysRevLett.117.126801 (Sep. 16, 2016).

Idaho National Laboratory APA citation: Flexible nanoantenna arrays capture abundant solar energy (Aug. 11, 2008) accessible at https://phys.org/news/2008-08-flexible-nanoantenna-arrays-capture-abundant.html.

Gadalla et al., Design, Optimization and Fabrication of a 28.3 THz Nano-Rectenna for Infrared Detection and Rectification. Scientific Reports, 4 : 4270 | DOI: 10.1038/srep04270; Mar. 6, 2014.

Lopez-Suarez, et al., Nanostructured graphene for energy harvesting, Physical Review, B 84, 161401(R) (2011) Oct. 6, 2011.

Examination report issued for African Application No. AP/P/2022/014470, dated Oct. 16, 2023.

Office Action from corresponding JP2022-564674, dated Feb. 21, 2025, 14 pages.

* cited by examiner

DEVICE FOR AMBIENT THERMAL AND VIBRATION ENERGY HARVESTING

CROSS REFERENCE TO RELATED APPLICATIONS

This application claims priority to and incorporates by reference U.S. Provisional Patent Application Ser. No. 63/013,631 filed on Apr. 22, 2020, and entitled Ambient Thermal and Vibration Energy Harvesting.

STATEMENT REGARDING FEDERALLY FUNDED RESEARCH

The research presented in this disclosure has not relied on any government funds during development operations.

FIELD

The disclosed technology generally relates to systems, devices, and methods for harvesting thermal and vibrational energy.

BACKGROUND

Energy harvesting is the practice of capturing traditional power from external sources, but also utilizing emerging technologies to capture the energy created from thermal energy sources, vibration sources (e.g. vehicles, machines, buildings, and human motions), and kinetic sources. This captured energy can then be used for various applications. For example, capacitors have long been standard equipment in energy storage but new techniques allow for additional approaches to energy harvesting.

In newer embodiments, the plates of the capacitor may be variable gap capacitors that are capable of actually generating alternating current that can be rectified for power storage. See U.S. Patent Pub. No. 20190386584 ("Energy Harvesting Devices and Sensors and Methods of Making and Use Thereof"), which is incorporated by reference as if set forth fully herein. In the commonly owned '584 publication, a plate (optionally a graphene membrane) is fixed at one end and will vibrate up and down between two extremes when it is excited by applied energy, ambient energy, vibrations, heat, light and the like. By flexing and oscillating between the two extremes, the strain/stress developed on the surface of the plate can be used to capture energy.

In one example, vibrations at the atomic scale are omnipresent, even in a mechanically quiet environment. This is due to the material being held at some temperature above absolute zero, and are called thermal vibrations. It is with respect to these and other considerations that the various embodiments described below are presented.

Thermal energy, such as that which induces the vibrations described above, also induce electrical responses in numerous other circuits. The signals generated by thermal energy, however, must not only be captured but also transformed into reliable, consistent power signals if the energy is to be harvested for use in other applications. A need currently exists in the energy sector for circuits, methods, and systems used to harvest electrical energy produced by thermal systems, even in ambient thermal conditions.

BRIEF SUMMARY OF THE DISCLOSURE

In one embodiment, an energy harvesting system includes a DC voltage source connected to at least one capacitor that generates an AC noise signal. A selected bandwidth of the AC noise signal transmits through the capacitor as a first AC power signal, and respective diodes rectify the first power signal to charge a positive cycle storage capacitor and a negative cycle storage capacitor with the first AC power signal.

In another embodiment, the AC noise signal is a thermal noise signal and the at least one capacitor is a plurality of capacitors connected in series.

In another embodiment, the capacitor is configured with storage capacity of 1 pico-Farad.

In another embodiment, the first AC power signal is rectified through a forward biased diode during a positive cycle of the first AC power signal to produce an output power signal.

In another embodiment, the first AC power signal is rectified through a reverse biased diode during a negative cycle of the first AC power signal to produce an output power signal.

In another embodiment, the diodes are paired as a sub-unit and the subunit is connected to a positive cycle metal trace connection and a negative cycle metal trace connection, and the sub-units are repeated with respective connections to the positive cycle metal trace connection and the negative cycle metal trace connection.

In another embodiment, the forward based diode and the reversed biased diode are connected to additional diodes in a Cockcroft-Walton full-wave rectifier and multiplier circuit.

In another embodiment, a plurality of capacitors in the energy harvesting system are variable gap capacitors generating both the first AC power signal from the AC noise signal and a second AC power signal from a variable gap capacitor discharge cycle.

In another embodiment, the capacitor is fully charged by the DC voltage source to a stable state.

In another embodiment, the diodes are selected based on the rate of conductance to match the capacitor as a noise source.

In another embodiment, the AC noise signal comprises conductivity due to conductive carrier defect hopping through the capacitor.

In another embodiment, the DC voltage source provides a voltage that corresponds to turn on voltages for the diodes.

Another embodiment of this disclosure is an integrated circuit on a chip, and the integrated circuit includes at least one capacitor connected to the circuit to generate an AC noise signal. A selected bandwidth of the AC noise signal transmits through the capacitor as a first AC power signal. Respective rectifiers receive a positive cycle of the first AC power signal and a negative cycle of the first AC power signal. Output terminals connected to the respective rectifiers and configured for connection to an off chip circuit. In another embodiment, the AC noise signal within the circuit results from ambient thermal energy.

In another embodiment, the integrated circuit is configured to connect to an off chip circuit that has a DC voltage source connected to the plurality of capacitors, a positive cycle storage capacitor and negative cycle storage capacitor charged with the first AC power signal.

In another embodiment, the integrated circuit has a first diode configured as a first respective rectifier of the first AC power signal to produce a first output power signal from a positive cycle of the first AC power signal.

In another embodiment of the integrated circuit, a second diode is configured as a second respective rectifier of the first AC power signal to produce a second output power signal from a negative cycle of the first AC power signal.

In another embodiment of an integrated circuit, the integrated circuit has at least one capacitor generating an AC noise signal. A selected bandwidth of the AC noise signal transmits through the capacitor as a first AC power signal. Respectively forward biased and reversed biased transistors rectify corresponding positive and negative cycles of the AC noise signal. Output terminals are connected to the transistors and configured for connection to an off chip circuit for energy harvesting from output signals.

In a method embodiment, the method of assembling an energy harvesting circuit includes connecting at least one capacitor within the energy harvesting circuit; forming a capacitive region in the energy harvesting circuit by defining the at least one capacitor with a first capacitor plate having an initial separation distance with respect to a first surface of a free-standing membrane, wherein the first surface of the free-standing membrane defines a second capacitor plate; exposing the free standing membrane to ambient thermal energy to induce charge accumulation in the capacitive region, the ambient thermal energy also inducing a thermal AC noise signal; selecting the capacitance of the capacitor to select a bandwidth of the AC noise signal transmitting through the capacitor as a first AC power signal; and rectifying the first AC power signal to charge a positive cycle storage capacitor and a negative cycle storage capacitor with the first AC power signal.

In another embodiment of the method, the method includes positioning the membrane relative to the first capacitor plate such that the membrane is unobstructed and free to vibrate in response to ambient thermal energy, wherein vibration of the membrane defines cyclical ripple formations along the first surface, and wherein each ripple formation alternates between a peak and a trough relative to the first capacitor plate to change the initial separation distance in a variable gap capacitor.

In another embodiment of the method, the method includes discharging the capacitive region across a respective rectifier to direct accumulated charges to add a second power signal to the energy harvesting circuits.

BRIEF DESCRIPTION OF THE DRAWINGS

Reference will now be made to the accompanying drawings, which are not necessarily drawn to scale.

DETAILED DESCRIPTION

Figure 1B:
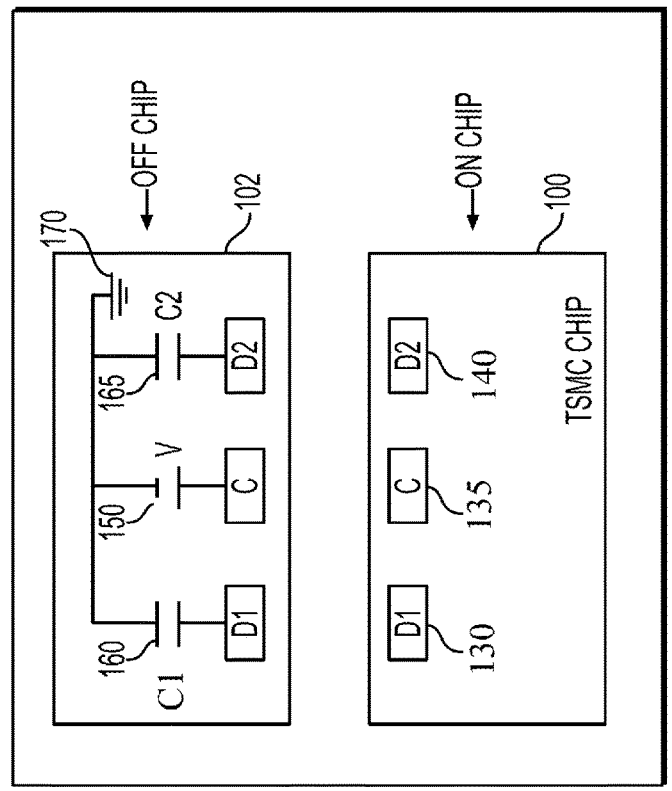
FIG. 1B is a schematic illustration of an off chip circuit that is compatible with the energy harvesting circuit according to FIG. 1A to store energy according to embodiments of this disclosure.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

In the following description, references are made to the accompanying drawings that form a part hereof and that show, by way of illustration, specific embodiments or examples.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other example embodiments include from the one particular value and/or to the other particular value.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

This disclosure illustrates hardware and associate methods by which noise energy that is present in all circuits can be directed to power harvesting circuits for use in other applications. A device for harvesting energy from ambient charge fluctuations may be based on this disclosure of a recent discovery that output power can be significantly amplified by the rate of change in conductance with respect to charge and/or voltage. The noise energy can be a planned signal of previously anticipated frequency and amplitude generated from selected hardware. In one non-limiting embodiment, a single source of noise energy is used to feed a noise signal to rectifying circuits for power delivery. That single source may be a series of capacitors as shown in the attached figures.

Figure 3A:
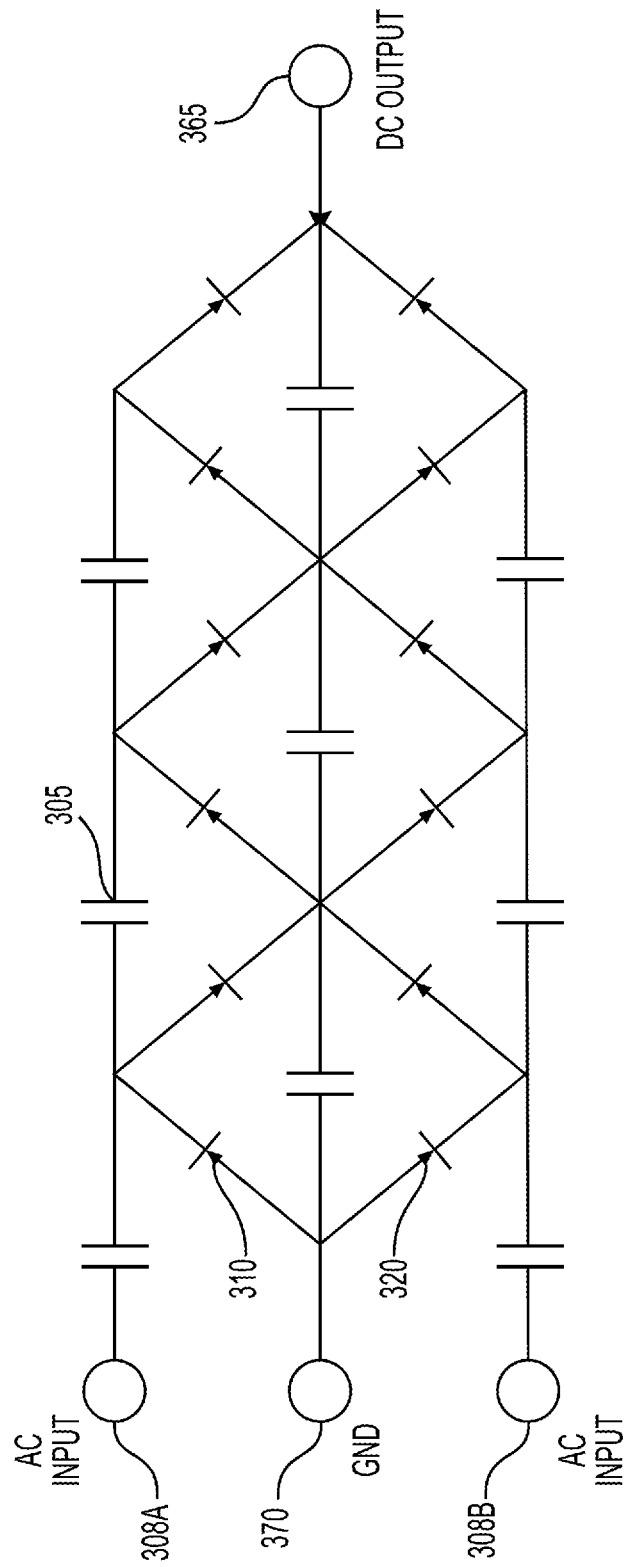
FIG. 3A is a schematic illustration of an energy harvesting circuit according to another embodiment of this disclosure and utilizing a multiplier circuit to achieve a DC output according to this disclosure.
Figure 3B:
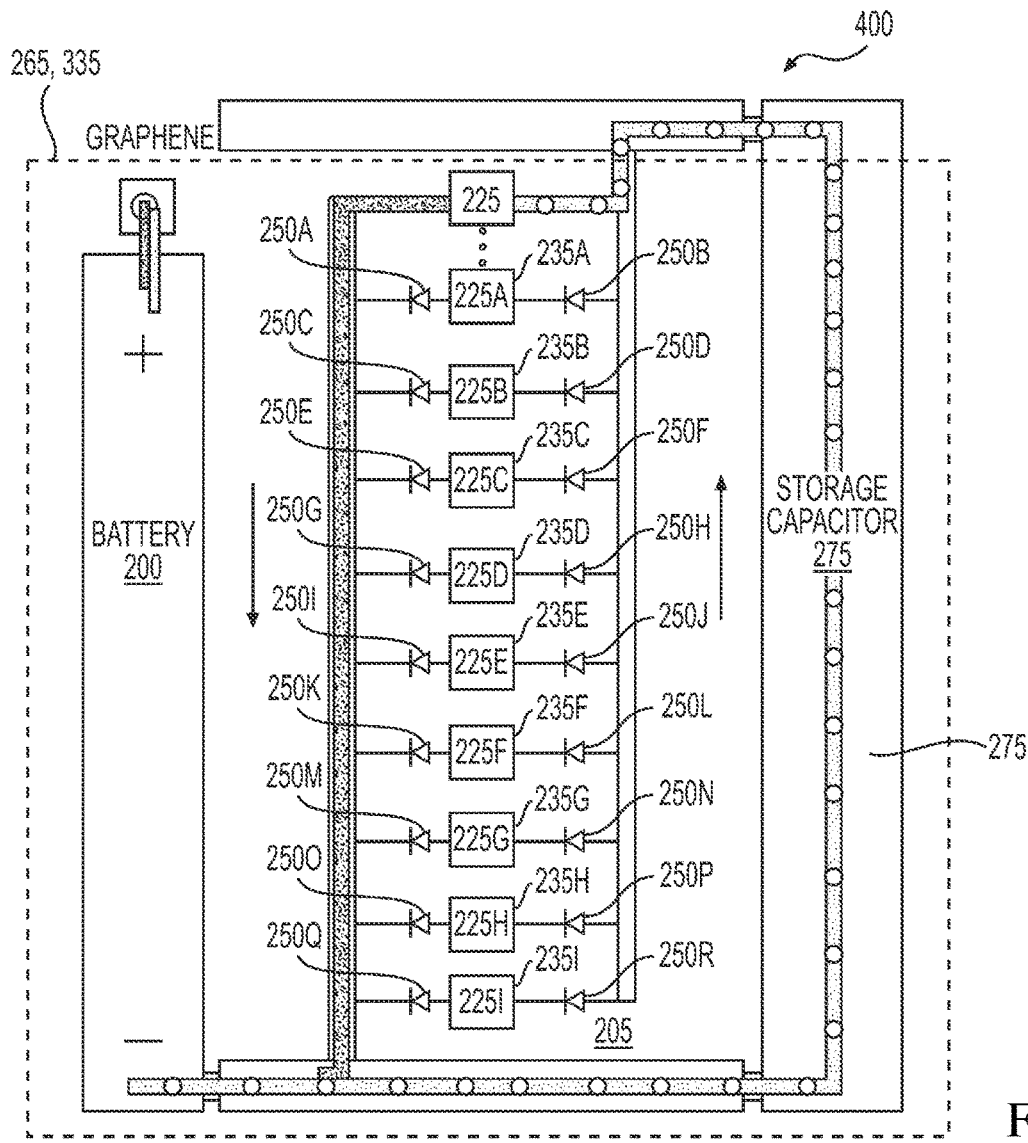
FIG. 3B is a schematic illustration of an example energy harvesting circuit establishing variable gap capacitors with a flexible membrane subject to ripples from ambient energy sources.

One non-limiting example of the single source of noise energy may be illustrated with regard to the disclosure of previously published, commonly owned U.S. Patent Pub. No. 20190386584 ("Energy Harvesting Devices and Sensors and Methods of Making and Use Thereof"), shown for example purposes as FIGS. 3B and 3C herein. FIGS. 3A and 3B are schematic illustrations of a silicon-based integrated circuit 400 with potentially millions of the energy harvesting elements 225. This design only has one power supply 200 and one storage capacitor 275, but these are not limiting factors. A first path (denoted with shading and dashes "- - - -") is when the current is adding charge to the graphene membrane, while the second path (denoted with circles "° ° °" is when the current is adding charge to the fixed storage capacitor 275. The silicon has an array of diode pairs 250A-250n with a respective metal contact 225A-225n in between each pair of diodes. The metal contacts 225 serve as the above-mentioned energy harvesting elements of the system. Above the metal contact 225 is the freestanding graphene 265 and it is in constant motion, forming peaks and troughs in response to ambient energy, vibrations and the like as described above. Each small electrode 225A-225n will be used to transport charge back to the graphene and/or a battery or into the storage capacitor 275 as the graphene membrane oscillates. This is one method for harvesting energy at the nanoscale with millions of graphene ripples each contributing electrical charge to the capacitor.

For illustration purposes and without limiting this disclosure to any one configuration, the embodiment of FIGS. 3A and 3B are notable in that the contacts 225A-2251 (or up to 225n with n being any number of contacts) serve as the traffic direction point for a variable capacitor to be charged and discharged in accordance with the earlier described embodiments. The flexible plate, shown as graphene membrane 265 covering the essential components, can be used as a first capacitor plate 335 and the metal contact 225 may be used as the second capacitor plate 235A-235n to form a variable capacitor (i.e., the distance between plates changes according to membrane ripples having peaks and troughs. These kinds of variable capacitors may be used as respective capacitors represented in the sets of capacitors 105A, 105B, 105C of FIG. 1A. The membrane may cover the entire circuit as shown or at least the metal contacts 225 to form the variable capacitor. This variable capacitor operates the same as the embodiments above in regard to the rippling of the membrane 265 occurring due to ambient thermal and vibrational kinetic energy causing the membrane 265, and thus one of the capacitor plates to be displaced and then return (emitting and storing charge in cycles). The cycles cause a corresponding change in the charge on the metal contact 225 such that when the capacitive region between the metal plate 225 and the membrane 265 increases in distance between the plates, the charge collected on the metal contact is displaced toward the storage capacitor for harvesting. When the capacitive region between the plates 235, 335 of the variable capacitor 120 is at its smallest (i.e., the plates are closest together during a ripple trough), the capacitive charge is at Cmax with charge collected on the metal contact 235. In the example shown for the integrated circuit 400, during peak ripple times in a window region of the graphene membrane 265, positive charge carriers collected onto the metal contact are directed into the storage capacitor for current flow in the direction of the upward arrow (i.e., charging the fixed storage capacitor 275). During trough ripple times in a window region of the graphene membrane 265, positive charge carriers are further collected onto the metal contact with the negative carriers directed onto the graphene membrane 265 for current flow in the direction of the downward arrow (i.e., charging the voltage source 200).

Figure 3C:
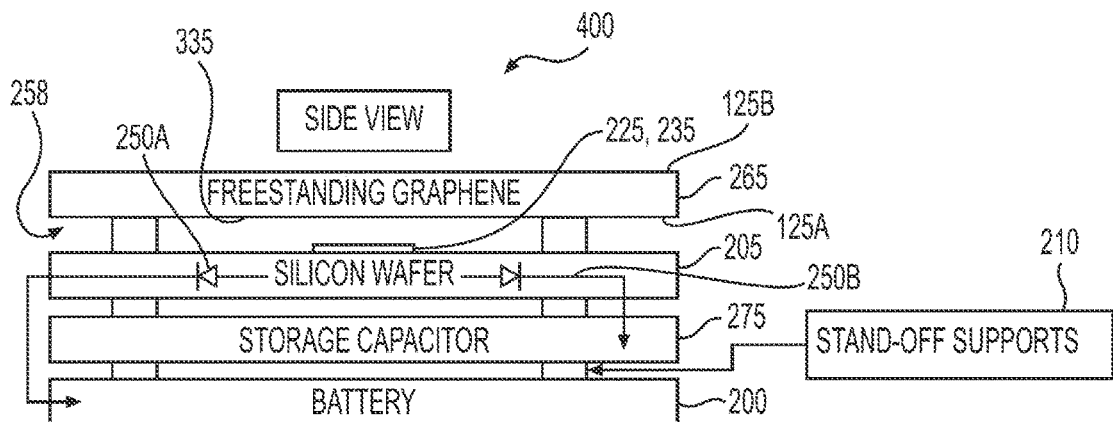
FIG. 3C is a cross section schematic of one section of the energy harvesting circuit of FIG. 3B.

FIG. 3C shows a side view of a cross section of the integrated circuit shown in FIG. 3B. A layered integrated circuit 400 includes the above described voltage source or battery 200, a fixed storage capacitor 275, and a harvesting circuit formed in a substrate such as but not limited to a silicon wafer 205. The freestanding membrane 265 is formed over the structure, and in this non-limiting example, the membrane is made of graphene. The diodes 250 are formed in the silicon wafer substrate 205. Stand-off supports 210 ensure proper separation and are sources of thermal as well as kinetic ambient energy. The freestanding graphene membrane 265 has a first surface 125A and second surface 125B with the first surface serving as a capacitor plate 335. The silicon wafer includes a metal contact 225 that is another capacitor plate 235 as discussed above. In certain embodiments that do not limit this disclosure, the freestanding graphene membrane 265 may be incorporated into a grid 258 that defines window regions for pairing with the metal contacts in forming the variable capacitor disclosed herein.

In another example, preliminary embodiment, an energy harvesting device having a power source for ambient thermal and vibration energy harvesting is disclosed, having an atomic two-dimensional membrane for buckling at a relatively low frequency. In non-limiting embodiments, the active component of the membrane can be carbon from graphite that is isolated. In certain embodiments, the source can use freestanding graphene which has a substantially large velocity component in the velocity probability distribution. A vibrating membrane may be a source of the noise signal but also another source of AC power released during discharge cycles of a capacitor fitted with the membrane. See U.S. Patent Pub. No. 20190386584, cited above.

Devices according to embodiments of the disclosed technology can be incorporated into a variety of systems, devices, and methods for extracting energy, including discharge sensors, force and mass sensors, and self-powered devices with longer charge life.

Devices according to embodiments of the disclosed technology are also contemplated for use as a mass detection device or flow charge sensor. For example, in certain implementations, an analytical computer component operatively connected with a two-dimensional membrane will have a predetermined sensitivity operable to sense and harness relatively low frequency vibrations from the membrane. Accordingly, the two-dimensional membrane will be subject to a buckling frequency and when a predetermined change is detected based on presence of a mass proximate the membrane, an output as to the detection of the mass will be determined and transmitted, due to the sensitivity of the membrane of the device to vibrations caused by forces originating at the mass.

The origin or source of energy collected in the above non-limiting examples is primarily thermal energy. In some non-limiting embodiments, the technology used to gather this energy will be silicon-based integrated circuits that have been custom designed. Once designed, the circuit can then be built by a commercially available semiconductor foundry service. This disclosure will also be amenable for a manufacturer to work directly with a multi-project wafer (MPW) third-party service.

Figure 1A:
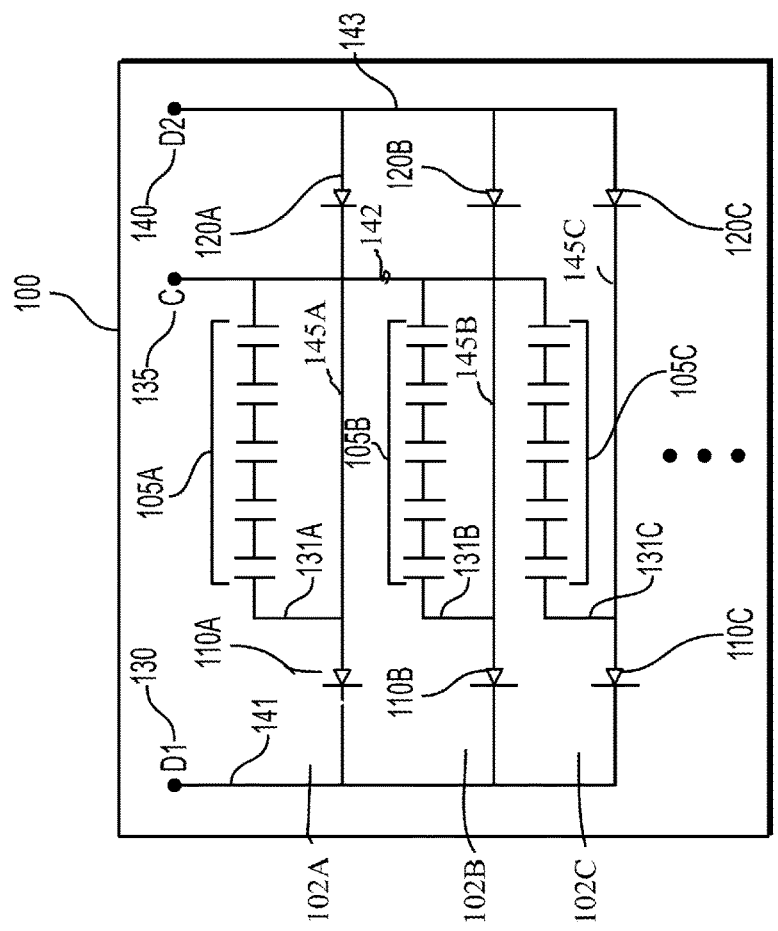
FIG. 1A is a schematic illustration of an energy harvesting circuit according to one embodiment of this disclosure.

One non-limiting design discussed below is shown in FIG. 1A and references FIGS. 3B and 3C. As shown in FIGS. 3B and 3C, and described in detail in co-pending U.S. Patent Pub. No. 20190386584, there is a series of capacitors connected to two diodes, and this is an energy harvesting circuit. In one non-limiting example, the sets of capacitors 105A, 105B, 105C of FIG. 1A may be variable-gap capacitors as shown in FIGS. 3B and 3C, discussed above and below, and as capacitor plates move they produce an AC voltage. The diodes of FIG. 1A then rectify this AC voltage signal.

At the top of FIG. 1A are three contact pads labeled D1, C, and D2. They allow access to the chip. D1 only connects to the left line of diodes, D2 only connects to the right diodes, and C only connect to the series of capacitors. The terms "right," "left," "top," "bottom," "vertical" and horizontal are used as example orientations with respect to the schematic illustration of FIGS. 1A and 1B and are not limiting of this disclosure. One example design, therefore, is made of vertically repeated subunits illustrated for example purposes as repetitive groups of diode pairs and sets of capacitors in series. More explicitly, in FIG. 1A, a first subunit 102A includes a first diode pair 110A, 120A and a first set 105A of capacitors in series; a second subunit 102B includes a second diode pair 110B, 120B and a second set 105B of capacitors in series; a third subunit 102C includes a third diode pair 110C, 120C and a third set 105C of capacitors in series. In an example embodiment, each subunit therefore has two diodes 110A, 120A, 110B, 120B, 110C, 120C connected together and aligned to pass current in the same direction. In FIG. 1A, the positive cycle of the circuit current would flow right to left.

Continuing with FIG. 1A, the output of the left most diodes 110A, 110B, 110C are connected together by a common metal trace called the diode 1 (D1) trace 141. The D1 trace 141 is also connected to a first contact pad 130 associated with D1 near the top left of the chip in the representation of FIG. 1A, which is used for off-chip access. Similarly, the input signal of the right most diodes 120A, 120B, 120C in the non-limiting figures are connected together by a common metal trace called the diode 2 (D2) trace 143. The D2 trace 143 is also connected to a second contact pad 140 labeled D2 near the top right of FIG. 1A and used for off-chip access. In each subunit, a respective middle metal trace 145A, 145B, 145C connects the two diodes together and has a respective third metal trace 131A, 131B, 131C coming off in the vertical direction of the figure. This third metal trace 131A, 131B, 131C connects to a respective series of capacitors 105A, 105B, 105C at a first end of the capacitors. At the second end of the series of capacitors, a common metal trace exists and is called the capacitor (C) trace 142. The C trace 142 connects all the second ends of the capacitors together, and connects the capacitors to a contact pad labeled C 135 near the top and used for off-chip access. In an example assembly, the pattern of subunits of diodes and capacitors is then repeated thousands of times going down and across the chip, similar to that shown in FIG. 3B. The chip will have a limited number of connections for off-chip access. The minimum number of off-chip contacts would be three (D1, D2, and C). As discussed further below, instead of the power depending solely on the conductance, this device output shows that power also depends on the rate of change in conductance. This can boost the output power significantly.

Instead of using diodes above, this disclosure also includes using active rectification MOSFETs. This will provide a lower "turn-on" voltage and therefore provide lower losses. When active rectification is used, additional metal traces and metal contact pads will be required for off-chip access. These contacts allow power to be delivered to the chips MOSFET components.

The capacitance of the capacitors used above will be as small as possible and in non-limiting embodiments, may generally be less than 1 pico-Farad (pF). By adding the capacitors in series as shown in FIG. 1A (i.e., using the series of capacitors 105A, 105B, 105C for each of the single variable capacitors 225A-225n of FIG. 3B), the design lowers the capacitance by the number in the series. In other words, for each of the variable capacitors 225A-225n of FIG. 3B, one non-limiting construction incorporates several variable capacitors 105A, 105B, 105C in a series as shown in FIG. 1A and using the thermal noise of these series of capacitances to boost the power output of the circuit. For example, by having ten 1 pF capacitors in series the total capacitance of the series would then become 0.1 pF. The thermal voltage produced by the capacitors can be considered the power source (i.e., the noise power source discussed above). Matching this voltage to the diode performance will help minimize losses and maximize the output power.

Figure 2:
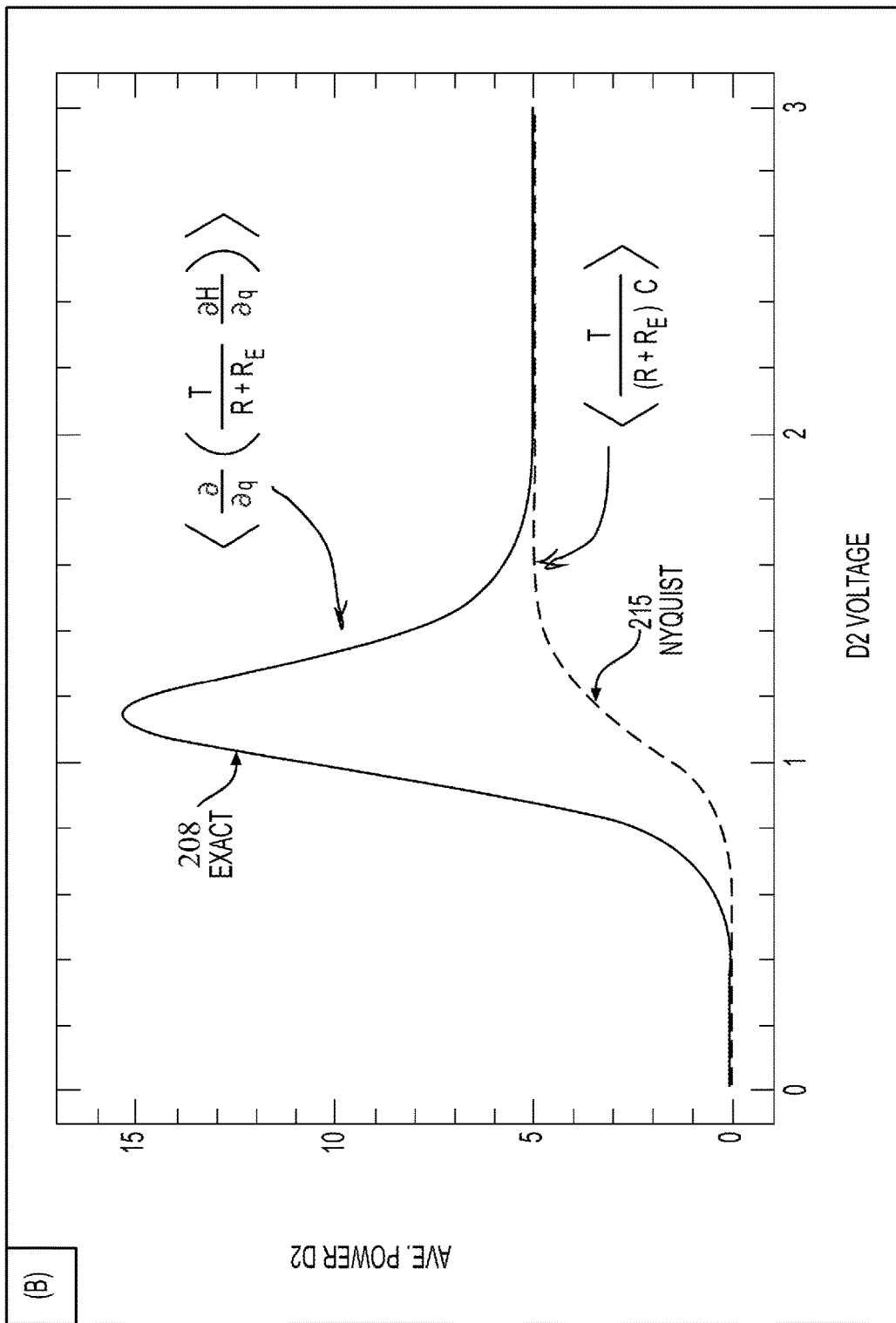
FIG. 2 is a schematic illustration of Nyquist noise signal power plotted alongside voltage versus average power of a rectified noise signal from the energy harvesting circuit according to FIG. 1A.

Recent theoretical discovery disclosed herein shows a power boost over the traditional Nyquist theory, as shown in FIG. 2. This power boost occurs when non-linear devices like diodes and the series of capacitors are used. FIG. 2 illustrates a comparison of an exact theoretical model predicting an output power boost from the design of this disclosure, above Nyquist's theory, when non-linear devices like diodes are used. Equation 1 represents the historical Nyquist finding:

$$<T/(R+R_E)C> \qquad \text{Eq. 1}$$

The angle brackets, < >, denote that the value plotted in FIG. 2 is the average value. Inside the brackets, T is for Temperature, and R is for a load resistance (i.e., the device or application connected to the circuit of FIG. 1A and drawing power). R has a constant value. C is the capacitance value, such as, but not limited to, a variable capacitance of a plate-graphene junction as described in U.S. Patent Pub. No. 20190386584 and shown in FIG. 3B. R_E is the equivalent resistance of two diodes that, in this example embodiment, are in opposition as shown in FIG. 3C. The value of R_E is not constant but depends on the current flowing in the circuit. After all, current is the time rate of change in the charge. The Nyquist plot 215 of FIG. 2 is average power output at D2 140 for voltages at D2 140 of FIG. 1.

Equation 2 represents at least one advancement disclosed herein:

$$<\partial/\partial_q(T/R+R_E \partial H/\partial q)> \qquad \text{Eq. 2}$$

Figure 4:
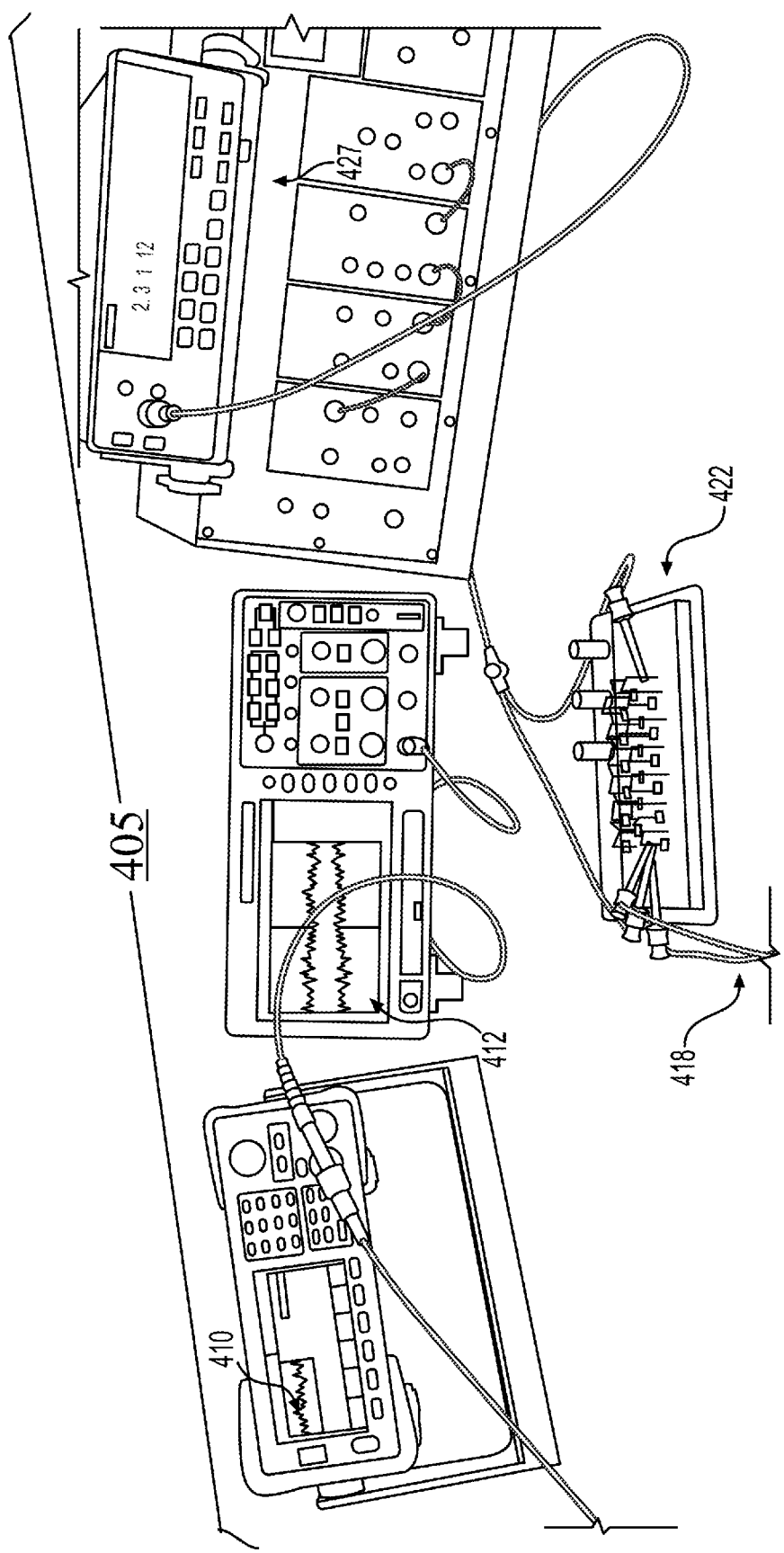
FIG. 4 is a schematic illustration of a test set up measuring output power signals from an AC noise signal applied to a rectifying circuit according to FIG. 3.

Here the new term has the variable H in it. H is the total energy of one plate of one variable capacitor, such as the graphene 265 of FIGS. 3B, 3C (i.e., the Hamiltonian value of the system). In the non-limiting example of FIGS. 3A, 3B, the energy of the graphene membrane depends on the charge, q. Therefore, with d representing change (delta), dH/dq=q/C. If R_E was constant, then d/dq(dH/dq)=1/C and gives us the Nyquist formula. But, the d/dq term also expresses the rate of change in resistance for the diodes as the charge changes (changing charge is current). The calculation cannot be written in a simple form, so the formula's value is plotted as an exact output 208 to graphically show the enhancement over the Nyquist formula. The test set-up 405 plotting these results 410, 412 from a test circuit 418, 422 monitored by a computer 427 is shown in FIG. 4. Numerous computerized components may be incorporated into all embodiments of this disclosure.

Figure 5:
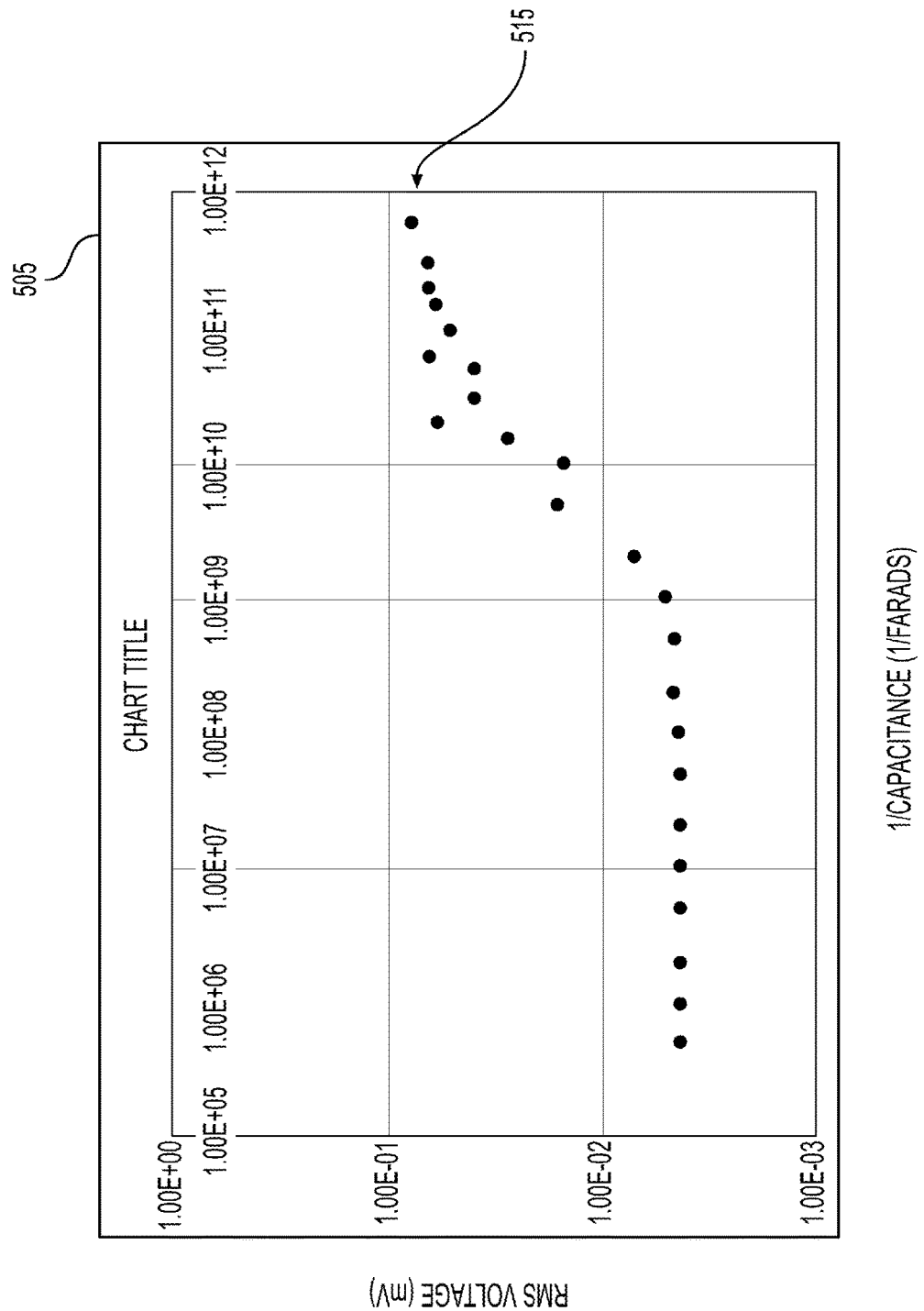
FIG. 5 is a plot of inverse capacitance values versus RMS voltage of the DC voltage source shown in FIG. 1A with the inverse capacitance values being added in accordance with a series of capacitors as shown in FIG. 1A.

The graph of FIG. 5 shows the output noise voltage for various capacitors as tested according to this disclosure. The plot 505 shows output voltage vs. 1/C. It is notable that the larger the values of 1/C, the larger the output voltage. The smallest capacitance shown at 515 is not limiting of this disclosure but is 10^-12 Farads (1 pF).

FIGS. 1A and 1B have been described above as showing a first non-limiting embodiment. An energy harvesting system as shown in FIG. 1B includes an on chip circuit 100 (shown in detail in FIG. 1A) and an off chip circuit 102 (that may be comparable, but not limited to, to the circuits of FIGS. 3A, 3B for discussion purposes). The off chip circuit 102 includes a DC voltage source 150 connected to a plurality of capacitors 105A, 105B, 105C in the on chip circuit 100 that are connected in series, as discussed above, and generate an AC noise signal on lines 131A, 131B, 131C. This connection is shown in FIG. 1B at the contact pad labeled C 135 connecting the C trace 142 of FIG. 1 as the AC voltage source. By choosing capacitors of planned specifications, a selected bandwidth of the AC noise signal is transmitted through the series of capacitors 105A, 105B, 105C as a first AC power signal. The capacitors take into account noise response such as measures of noise signal standard deviation. In one non-limiting theory of operation, the AC noise signal includes, at least, conductivity due to conductive carrier defect hopping through the capacitors. The first AC noise signal 131A, 131B, 131C is directed to respective diodes 110A, 110B, 110C, 120A, 120B, 120C rectifying the first power signal to charge a positive cycle storage capacitor 160 and negative cycle storage capacitor 170 with the first AC power signal. The series of capacitors reduces an overall capacitance of the series as a whole due to the additive nature of reciprocal capacitances in the example series. In one non-limiting embodiment the capacitors are configured with a storage capacity of one picofarad (1 pF).

FIG. 1 takes advantage of an AC noise signal 131A, 131B, 131C that is present across the series of capacitors, and in one non-limiting embodiment, the noise signal is thermal noise. The thermal noise can be controlled, in part at least, by the ambient conditions of a chip bearing the circuit of FIGS. 1A and 1B. For example the circuit of FIG. 1A may be exposed to a heated environment to increase the amplitude of thermal noise. The first AC noise signal 131A, 131B, 131C is a subset of frequencies of the ambient noise signal that transmit through the capacitors. The first AC noise signal is rectified through a forward biased diode 110A, 110B, 110C during a positive cycle of the first AC noise signal to produce an output power signal. The first AC noise signal is further rectified through a reverse biased diode 120A, 120B, 120C during a negative cycle of the first AC power signal to produce a corresponding output power signal. The diodes may be paired as part of a subunit and the subunit is connected to a positive cycle metal trace connection 141 and a negative cycle metal trace connection 143. The sub-units are repeated with respective connections to the positive cycle metal trace connection and the negative cycle metal trace connection.

In some non-limiting versions of the embodiment shown in FIGS. 1A and 1B the plurality of capacitors are fully charged by a DC voltage source (similar to FIG. 3B Ref. 200), positioned either off chip (FIG. 1B) or on chip if necessary, to a stable state. The DC voltage source 200 provides a voltage that corresponds to turn on voltages for the diodes or other nonlinear circuit components in use. The diodes are selected based on the rate of conductance to match the plurality of capacitors as a noise source.

In another embodiment, the forward based diode and the reversed biased diode are connected to additional diodes in a Cockcroft-Walton full-wave rectifier and multiplier circuit as shown in FIG. 3A. The AC noise signal 131A, 131B, 131C shown in FIG. 1A as an output from the series of capacitors 105A, 105B, 105C can be connected to a positive terminal 308A and a negative terminal 308B. The full wave rectifier establishes a multiple of input power in stages having a forward biased diode 310 and reverse biased diode 320, and rectified power signals are directed to a DC output 365.

The circuits of the corresponding figures herein may make use of a plurality of capacitors 305 having variable gap capacitors generating both the first AC power signal from the AC noise signal and a second AC power signal from a variable gap capacitor discharge. The variable gap capacitor technology is discussed above and U.S. Patent Pub. No. 20190386584 ("Energy Harvesting Devices and Sensors and Methods of Making and Use Thereof"), which is incorporated by reference as if set forth fully herein, discusses that technology in detail.

As shown in FIG. 1A and FIG. 1B the energy harvesting circuit may be implemented as an integrated circuit on a chip. FIG. 1A illustrates an on-chip circuit having a plurality of capacitors that are connected in series and generate the above-described AC noise signal. A selected bandwidth of the AC noise signal transmits through the series of capacitors as a first AC power signal. Respective rectifiers receive a positive cycle of the first AC power signal and a negative cycle of the first AC power signal. Output terminals connected to the respective rectifiers and configured for connection to an off chip circuit. In one non-limiting embodiment shown in FIG. 1B, the off chip circuit may include companion circuits including but not limited to a DC voltage source connected to the plurality of capacitors, a positive cycle storage capacitor and negative cycle storage capacitor charged with the first AC power signal. When the off chip circuit is configured as in FIGS. 3B, 3C, the normal operation of discharging the capacitive regions across a respective rectifier also directs accumulated charges to add a second power signal to the energy harvesting circuits. In other words, the rectified thermal noise signal 131A, 131B, 131C of this disclosure is a first power signal and in some embodiments, normal variable capacitor energy harvesting as shown in FIGS. 3B, 3C are a second power signal for energy harvesting.

The variable gap capacitor technology discussed above lends itself to an efficient energy harvesting circuit. The steps of that method may include, at least, connecting a series of capacitors within the energy harvesting circuit; for each of the capacitors in the series, forming a capacitive region in the energy harvesting circuit by defining a first capacitor plate having an initial separation distance with respect to a first surface of a free-standing membrane. The first surface of the free-standing membrane defines a second capacitor plate. Exposing the free standing membrane to ambient thermal energy induces charge accumulation in the capacitive region, and the ambient thermal energy also inducing a thermal AC noise signal. The method includes selecting the capacitance of the capacitors to select a bandwidth of the AC noise signal transmitting through the series of capacitors as a first AC power signal. In accordance with the rest of this disclosure, the method includes rectifying the first AC power signal to charge a positive cycle storage capacitor and a negative cycle storage capacitor with the first AC power signal. Implementing the method includes, in non-limiting embodiments, positioning the membrane relative to the first capacitor plate such that the membrane is unobstructed and free to vibrate in response to ambient thermal energy. The vibration of the membrane defines cyclical ripple formations along the first surface, and each ripple formation alternates between a peak and a trough relative to the first capacitor plate to change the initial separation distance in a variable gap capacitor. Discharging the capacitive region across a respective rectifier directs accumulated charges to add a second power signal to the energy harvesting circuits.

Experimental Disclosure

As discussed in the above referenced patent publication for energy harvesting, U.S. Patent Pub. No. 20190386584 ("Energy Harvesting Devices and Sensors and Methods of Making and Use Thereof"), the linear power formula found from models for the output power is similar to Nyquist's formula P=kBT/RC. Here C is the average capacitance of the fluctuating graphene. Under certain modelling condition, the total movement of the graphene can be made small, but the formula is still the same. This means that a fixed capacitor should also work and give the same formula, where the fixed capacitance is the average capacitance. Testing has shown that the output power is enhanced at lower frequencies. The mechanism in the main, but non-limiting, model used herein, is the slower rate at which the graphene inverts its curvature due to a buildup of strain. In one non-limiting theory of operation, the conduction mechanism (barrier crossing rate), is thought to be the origin of all 1/f noise.

As it turns out, 1/f noise is present in all electronics, including fixed capacitors (thought to be due to defect hopping). This means that a fixed capacitor will also give enhanced power at lower frequencies. The voltage fluctuations for output of a variable gap capacitor (Vrms) for graphene experiments are small and around 30 mV. Since one goal is to rectify the signal, it is best to have this voltage be at or above the "turn on" diode voltage (200 mV for Schottky). Silicon diodes (turn on is 700 mV) have also been tested to active rectification using MOSFET technology. These device require a small amount of power to operate, but their turn-on voltage is only 10 mV. Comparing applications in the solar industry, the ohmic losses when using silicon were much greater than the power used to drive the MOSFETs. This allows us to take full advantage of the amplifier benefits offered by transistors.

One test example, such as shown in FIG. 4, was built in the form of a full-wave rectifier 418 with an added times ten multiplier circuit out of passive diodes and capacitors to test this. Recalling that a noise signal would, in reality, originate from a series of capacitors, but when a simulated test input a noise signal 410, 412 having a Vrms of 200 mV (mean of zero), the output 422 was 2 V DC as shown for experimentation on a multimeter 427. Since this worked for Schottky (and silicon at 700 mV), this same theory of operation will work at 10 mV with MOSFETs. Voltage being low is not a problem. For fixed capacitors, the voltage is lower than graphene, but fixed capacitors demonstrate in the lab that when one connects 16 capacitors in series, for example, the output voltage rises by a factor of four. The results of this disclosure and associated testing indicates that by designing associated integrated circuits, users can have them built by known foundry sources. In one non-limiting embodiment, the circuits can be laid out any way desired and generally have over 10,000 circuit elements on a 2.5 mm by 2 mm chip. In one example, the smallest capacitance capacitor that one example foundry makes is 0.2 pF, which is small enough (plus the footprint is tiny). This leads to the conclusion that one can design an array of these capacitors, followed by the active rectification multiplier circuit to produce a power generating chip with current technology. This chip would be low risk, low cost, and would help us work toward the more powerful graphene chip.

In addition as further discovered in the research model, that when capacitors are arranged with diodes and resistors in a particular circuit layout, the output power is boosted above the known formula for the Nyquist comparison.

Figure 7:
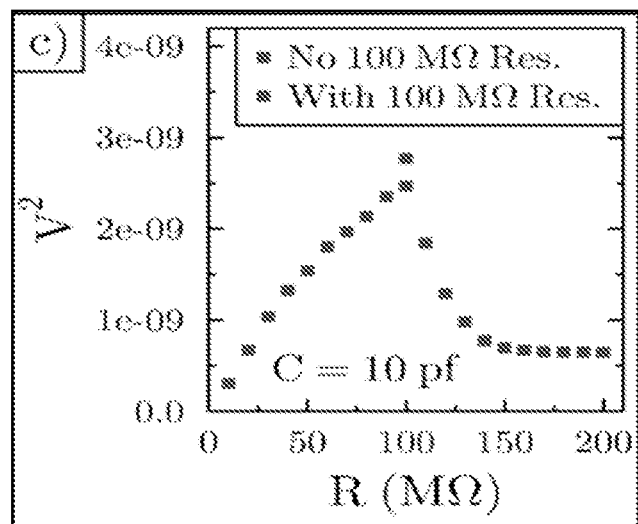
FIG. 7 is a plot of test results showing noise voltage from a resistor and 10 pF capacitor connected together in parallel. The noise voltage is a maximum when the source resistance is 100 mega-ohms, which matches the load resistance.

As shown in FIG. 7, this disclosure successfully developed a detailed physical understanding of the Nyquist noise voltage. The noise voltage increases with decreasing capacitance as originally predicted. This disclosure also illustrates an increase in the noise power by a factor of about ten, when the test circuit adds a specific resistor value in parallel with the series of capacitors 105A, 105B, 105C. The value of the resistance must match the resistance of the circuit used to measure the noise power. The data for this discovery is shown in FIG. 7. Here, the noise voltage originating from a 10 pF capacitor is shown as a function of the resistance value of the resistor connected in parallel with the 10 pF capacitor. When the parallel resistance is 100 mega-ohms, the noise voltage is a maximum. This resistance is the same as the measurement circuit. With no resistor added in parallel, the noise voltage drops by a factor of 10. No resistor amounts to adding an extremely large resistance in parallel. The trend line for adding too large of a resistance is shown by the squares in FIG. 7.

Figure 8:
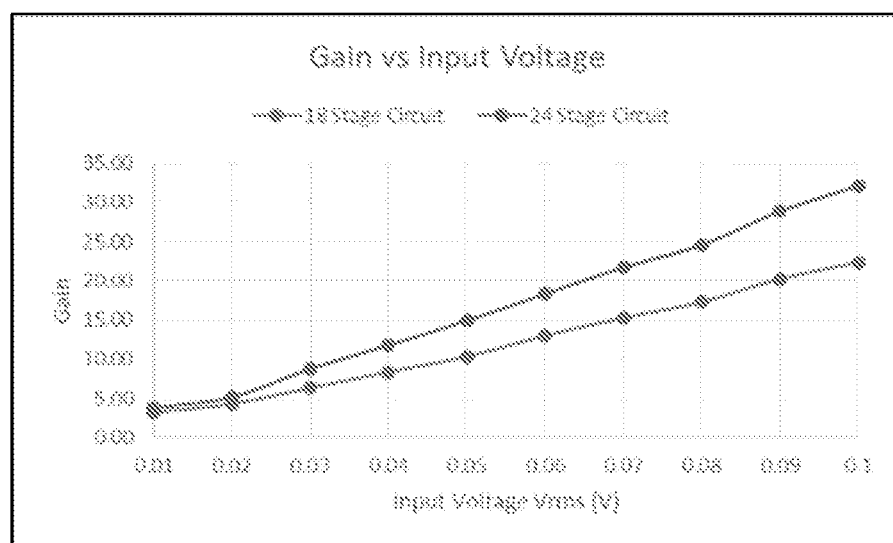
FIG. 8 is a graph that shows the gain vs. input voltage for both an 18-stage and 24-stage Schottky Cockcroft-Walton circuit according to this disclosure.

As shown in FIG. 8, this disclosure tested three rectifier-multiplier circuit topologies on a breadboard, and then tested them using a noise power input source. The topologies are known as differential drive, charge pump, and Schottky Cockcroft-Walton. Unfortunately, the differential drive actually divides the signal instead of multiplies. The other two topologies multiply the signal, but the Schottky Cockcroft-Walton provides the best performance. The gain for both an 18-stage and a 24-stage Schottky Cockcroft-Walton rectifier-multiplier circuit as a function of the input noise voltage is shown in FIG. 8. When the input noise voltage has an rms value of 10 mV, the output voltage is about five times larger, or 50 mV DC. In the silicon wafer chip, the results show the input rms noise voltage to be 100 mV, in which case, the output voltage is a very respectable 3.5 volts DC.

Figure 6:
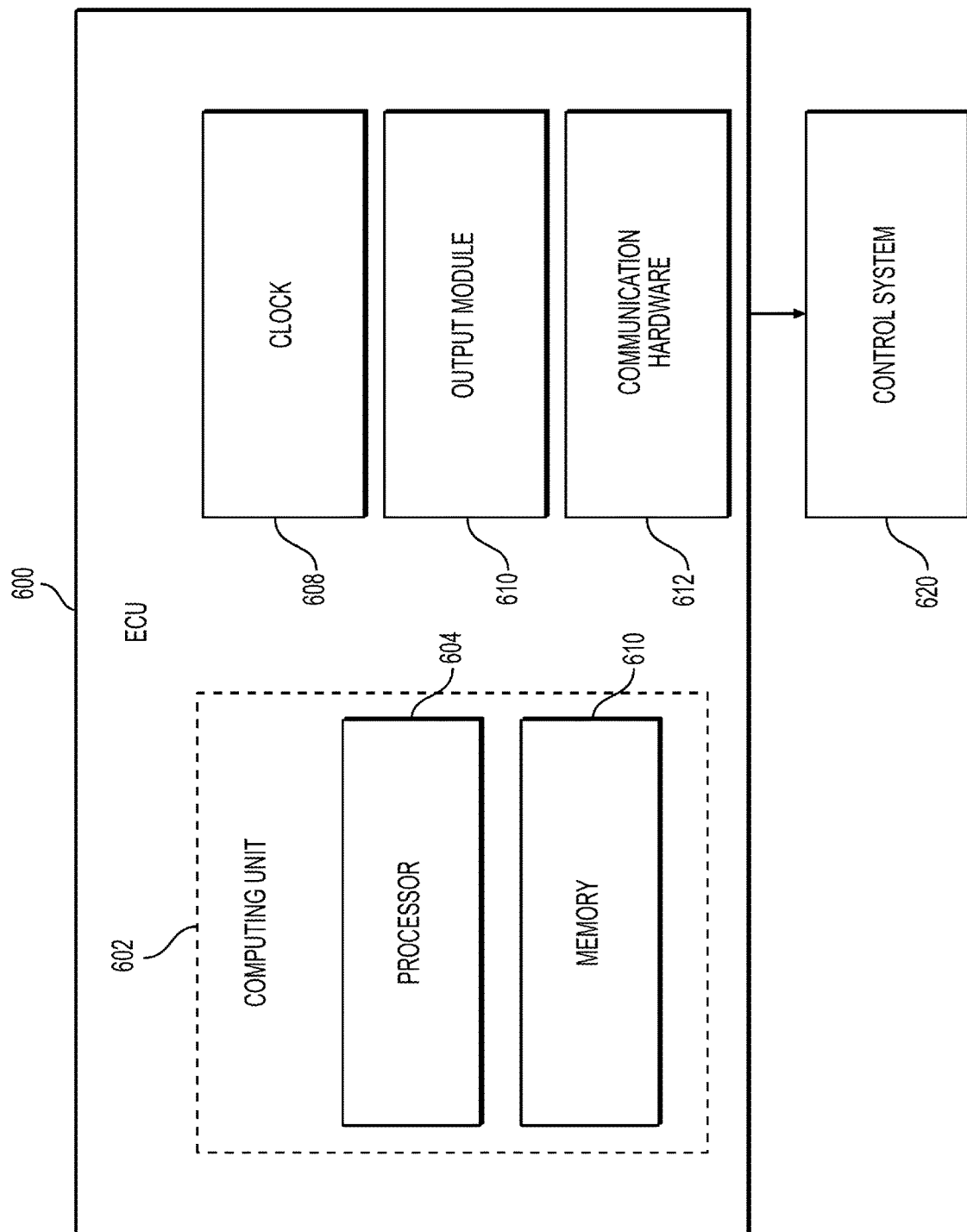
FIG. 6 is a schematic illustration of a computer environment in which the methods and systems of this disclosure may operate.

FIG. 6 of this disclosure shows that the computerized system described herein may be used in conjunction with equipment that monitors or assists with energy harvesting. New models/functions can be pushed to various servers and cloud based servers if necessary.

Implementations described above and in relation to FIGS. 1 through 6 may be used with equipment that implements computerized methods that are activated with an electronic control unit ("ECU") 600. In particular, the described equipment, including computers used as part of a system communicate with a computer processor configured to process one or more characteristics and/or profiles of the electrical signals received. By way of example and without limiting this disclosure to any particular hardware or software, FIG. 6 illustrates a block diagram of a system herein according to one implementation.

The ECU 600 may include a computing unit 606, a system clock 608, an output module 610 and communication hardware 612. In its most basic form, the computing unit 606 may include a processor 604 and a system memory 610. The processor 602 may be a standard programmable processor that performs arithmetic and logic operations necessary for operation of the sensor system 600. The processor 602 may be configured to execute program code encoded in tangible, computer-readable media. For example, the processor 602 may execute program code stored in the system memory 604, which may be volatile or non-volatile memory. The system memory 604 is only one example of tangible, computer-readable media. In one aspect, the computing unit 606 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 602, the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. An energy harvesting system, comprising:
a DC voltage source connected to a source of noise energy comprising a series of capacitors that generates an AC noise signal;
a selected bandwidth of the AC noise signal transmitting through the series of capacitors as a first AC power signal;
respective diodes rectifying the first power signal to charge a positive cycle storage capacitor and a negative cycle storage capacitor with the first AC power signal,
wherein the first AC power signal is rectified through a reverse biased diode during a negative cycle of the first AC power signal to produce an output power signal transmitted to the negative cycle storage capacitor;
wherein the first AC power signal is rectified through a forward biased diode during a positive cycle of the first AC power signal to produce a respective output power signal transmitted to the positive cycle storage capacitor, and
wherein the diodes are paired as a sub-unit and the sub-unit is connected to a positive cycle metal trace connection and a negative cycle metal trace connection, and the sub-units are repeated with respective connections to the positive cycle metal trace connection and the negative cycle metal trace connection.

2. The system of claim 1, wherein a respective capacitor in the series of capacitors is configured with storage capacity of 1 pico-Farad.

3. The system of claim 1, wherein the forward biased diode and the reversed biased diode are connected to additional diodes in a Cockcroft-Walton full-wave rectifier and multiplier circuit.

4. The system of claim 1, wherein the series of capacitors comprises variable gap capacitors generating both the first AC power signal from the AC noise signal and a second AC power signal from a variable gap capacitor discharge cycle.

5. The system of claim 1, wherein respective capacitors in the series of capacitors are fully charged by the DC voltage source to a stable state.

6. The system of claim 1, wherein the diodes are selected based on the rate of conductance to match the series of capacitors as a noise source.

7. The system of claim 1, wherein the AC noise signal comprises conductivity due to conductive carrier defect hopping through the capacitor.

8. The system of claim 1, wherein the DC voltage source provides a voltage that corresponds to turn on voltages for the diodes.

\* \* \* \* \*